United States Patent [19]

Neal

[11] Patent Number: 5,745,184
[45] Date of Patent: Apr. 28, 1998

[54] CLOSED CAPTION SYSTEM FOR USE WITH COMPRESSED DIGITAL VIDEO TRANSMISSION

[75] Inventor: Charles Bailey Neal, Zionsville, Ind.

[73] Assignee: Thomson Consumer Electronics, Inc., Indianapolis, Ind.

[21] Appl. No.: 596,274

[22] PCT Filed: Aug. 20, 1993

[86] PCT No.: PCT/US93/07827

§ 371 Date: Feb. 7, 1996

§ 102(e) Date: Feb. 7, 1996

[87] PCT Pub. No.: WO95/06391

PCT Pub. Date: Mar. 2, 1995

[51] Int. Cl.$^6$ .............................. H04N 7/00; H04N 11/00
[52] U.S. Cl. .............................. 348/468; 348/465; 348/467
[58] Field of Search .............................. 348/468, 465, 348/467; 358/468; 395/2.91, 2.92; 375/240, 241

[56] References Cited

U.S. PATENT DOCUMENTS

| | | |
|---|---|---|
| 5,148,272 | 9/1992 | Acampora et al. .............................. 358/133 |
| 5,168,356 | 12/1992 | Acampora et al. .............................. 358/133 |
| 5,400,401 | 3/1995 | Wasilewski et al. .............................. 380/9 |
| 5,493,339 | 2/1996 | Birch et al. .............................. 348/461 |

OTHER PUBLICATIONS

ISO/IEC JTC 1/SC 29 N 147, 20 Apr. 1992, Tokyo, Japan, pp. 78–85, "Coded Representation of Audio, Picture Multimedia and Hypermedia Information".

Primary Examiner—John K. Peng
Assistant Examiner—Vivek Srivastavh
Attorney, Agent, or Firm—Joseph S. Tripoli; Eric P. Herrmann; Ronald H. Kurdyla

[57] ABSTRACT

Apparatus for compressing video information including digital data in horizontal or vertical blanking intervals of analog video signals includes circuitry (210) for retrieving such digital data. The retrieved digital data is formatted into auxiliary digital data packets. The analog video signal is compressed (214) according to, for example, the MPEG compression protocol and the auxiliary digital data packets are included (212) in the frame/picture headers of the compressed video signals.

7 Claims, 3 Drawing Sheets

CLOSED CAPTION SYSTEM FOR USE WITH COMPRESSED DIGITAL VIDEO TRANSMISSION

This invention relates to the transmission of closed caption and other auxiliary digital information in a compressed video transmission environment.

BACKGROUND OF THE INVENTION

Current standard video signals such as PAL or NTSC include vertical intervals, or fields, having a plurality of horizontal line intervals, e.g. 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert an auxiliary information component, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR 15,119 and 73.682) specifies that digital data corresponding to ASCII characters for closed captioning must be in line 21 of field 1. The FCC specified format provides for two eight-bit digital data words in each occurrence of line 21, field 1. The closed caption specification may be extended to provide for closed caption format data in line 21 of every field. The data in each word represents one ASCII format character. Closed caption signal data format that complies with the FCC standard is depicted in FIG. 1.

Recent (1993) developments in digital technologies have made practical the transmission of video signals in digital compressed format, allowing the transmission of more than one television signal in the same bandwidth as a conventional analog television signal. However the video compression processes tend not to be conducive to transmitting the digital codes such as the closed caption information contained in the vertical blanking intervals. The present invention therefore comprises a method and apparatus for transmitting and receiving closed caption information, for example, in a compressed video transmission/storage system.

SUMMARY OF THE INVENTION

Apparatus for compressing video information including digital data in horizontal or vertical blanking intervals of analog video signals includes circuitry for retrieving such digital data. The retrieved digital data is formatted into auxiliary digital data packets. The analog video signal is compressed according to, for example, the MPEG compression protocol and the auxiliary digital data packets are included in the frame/picture headers of the compressed video signals.

In a further embodiment including a receiver of compressed video signal with auxiliary digital data packets conveying closed caption data, for example, the compressed video signal and the auxiliary digital data packets are separated. The auxiliary digital data packets are encoded into analog closed caption signal format. The compressed video signal is decompressed into standard video signal format and combined with the analog closed caption signal for application to a television receiver or VCR.

DETAILED DESCRIPTION

In the description to follow, the invention will be described in terms of processing closed caption data in an NTSC video signal. However, the term "closed caption data" should be interpreted to include closed caption-like data, i.e., binary data included in an analog video signal where it will not be visible to the viewer. This may be data encoded like closed caption data, for example Extended Data Services or EDS data. The encoding of EDS data follows the same general format as for caption data encoding. Closed caption data is included in line 21. If EDS data is utilized, it is transmitted in line 284. The format for respective types of data consists of pairs of characters transmitted in the same field. The characters can be either a control code pair or a data pair. The first byte of the pair determines whether the pair is a control pair or a data pair. If the first byte is in the range of 0lh to 0Fh, the pair is a control pair. These values are not defined for captioning or text transmission. Upon receiving such a control code pair, the decoder would recognize the following data as EDS data. All characters are transmitted using odd parity. This is consistent with the current rules, and allows for simpler encoding/decoding hardware and software. In addition the invention may be practiced to convey teletext data.

Figure 2:
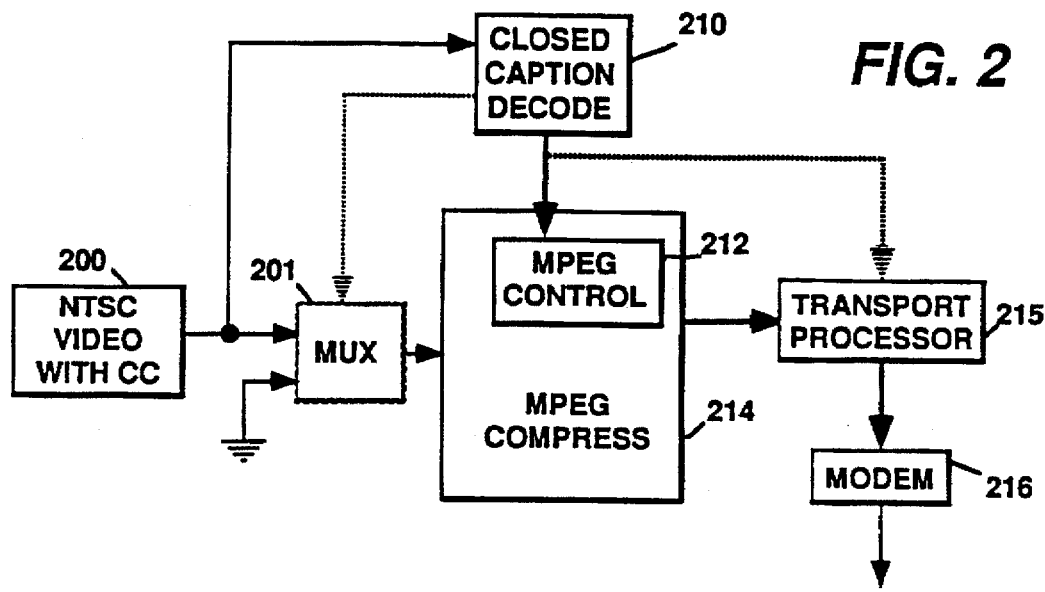
FIG. 2 is a block diagram of a video signal compression/transmission system embodying the present invention, which system includes circuitry for transmitting closed caption-like data as digital data rather than video data

Referring to FIG. 2, video signal including closed caption data on line 21 of the odd fields (or EDS data on line 284 of even fields if present) is provided from the source 200. This signal is coupled to a closed caption decoder 210 and, via a multiplexor 201, to a video signal compression apparatus 214, indicated as an MPEG compressor. The closed caption decoder 210 is arranged to recognize the horizontal line containing the closed caption data and to capture the closed caption data. The closed caption decoder also provides a timing signal which is used to condition the multiplexor 201 to pass the active portions of video signal from the source 200, and during the horizontal line containing the closed caption data to couple a reference value to the compressor 214. This eliminates the digital data from the video signal and affords a modicum of compression efficiency to the compressor 214.

An MPEG compressor, similar to other video signal compressors, in general includes two basic components. The first component operates on the video signal and performs the actual compression of the image information signal. The second component formats the compressed signal according to a desired protocol. Typically the second component includes a controller which generates header data and concatenates the header data with the compressed video data. According to the MPEG protocol, provision is made to include different types of user data within the picture headers associated with respective video frames/fields.

In the MPEG compressor 214, a controller 212 receives the reproduced closed caption data (without clock run-in and start bits) from the decoder 210. The controller 212 arranges this data as user data or extension data within the frame headers and concatenates this data with the compressed video signal generated in the compressor. The compressed signal including the separately coded closed caption data in the frame or picture headers is applied to the transport processor 215. The transport processor 215 segments the compressed video data into packets of predetermined amounts of compressed data, generates packet headers which identify the video information within respective transport packets, performs error detection/correction coding and concatenates the compressed segment, error code information and packet header to form a transport packet. Transport packets are coupled to a modem 216 for transmission or storage. For detailed information on transport packet processing the reader is referred to U.S. Pat. No. 5,168,356.

Table I illustrates the picture layer or frame header format specified in the MPEG protocol. This table is reproduced from a document, ISO-IEC/JTC1/SC29/WG11, CODED REPRESENTATION OF PICTURE AND AUDIO INFORMATION, MPEG 92/160, Document, AVC-260, May 1992 prepared under the auspices of the INTERNATIONAL ORGANIZATION FOR STANDARDIZATION operating under the procedures of The American National Standards Institute, X3 Secretariat: Computer and Business Equipment Manufacturers Association, Suite 500, 311 First Street NW, Washington, DC 20001-2178. The code indicates provision for both user data and extension data.

TABLE I

| PICTURE LAYER | # BITS | Mnemonic |
|---|---|---|
| picture () { | | |
|   picture_start_code | 32 | bslbf |
|   temporal_reference | 10 | uimsbf |
|   picture_coding_type | 3 | uimsbf |
|   vbv_delay | 16 | uimsbf |
|   if(picture_coding_type==2||picture_coding_type==3) { | | |
|     full_pel_forward_vector | 1 | |
|     forward_f_code | 3 | uimsbf |
|   } | | |
|   if (picture coding type==3 { | | |
|     full_pel_backward_vector | 1 | |
|     backward_f_code | 3 | uimsbf |
|   } | | |
|   while (nextbits()=='1') { | | |
|     extra_bit_picture | 1 | |
|     extra_information_picture | 8 | |
|   } | | |
|   extra_bit_picture | 1 | |
|   next_start_code() | | |
|   if(nextbits()==extension_start_code) { | | |
|     extension_start_code | 32 | bskbf |
|     picture_structure | 1 | uimsbf |
|     reserved | 7 | uimsbf |
|     while(nextbits()!='0000 0000 0000 0000 0000 0001') { | | |
|       picture_extension_data | 8 | |
|     } | | |
|     next_start_code() | | |
|   } | | |
|   if (nextbits()==user_data_start_code) { | | |
|     user_data_start_code | 32 | bslbf |

TABLE I-continued

| PICTURE LAYER | # BITS | Mnemonic |
|---|---|---|
|     while (nextbits()!='0000 0000 0000 0000 0000 0001') { | | |
|       user_data | 8 | |
|       next_start_code() } | | |
|   do { | | |
|     slice() | | |
|   } while (nextbits()==slice_start_code) | | |

An alternative embodiment of the invention is indicated by the dashed arrow extending from the decoder 210 to the transport processor 215. In this arrangement the closed caption data may be included in auxiliary transport packets or in header extensions of the transport packet headers. The format of suitable transport headers and extensions is illustrated in the U.S. Pat. No. 5,168,356.

Figure 3:
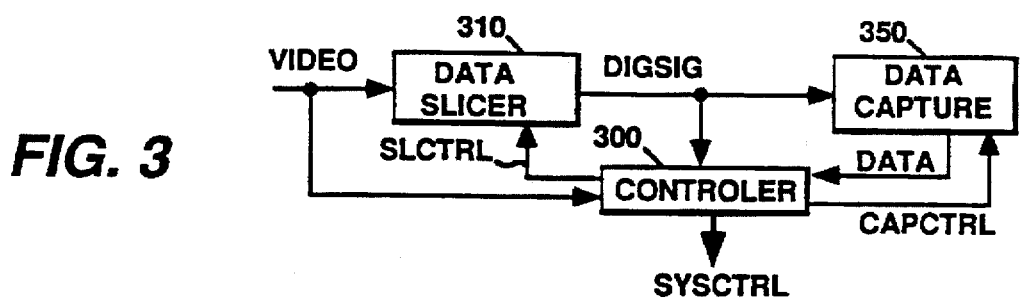
FIG. 3 is a block diagram of apparatus for processing and extracting closed caption-like data from analog television signals.

FIG. 3 illustrates an exemplary closed caption decoder apparatus which may be utilized for element 210 in FIG. 2. In FIG. 3, a composite video signal, VIDEO, which includes closed caption and/or EDS signal components, is input to a data slicer 310. The data slicer 310 converts information in the analog signal VIDEO, e.g. closed caption data, into a bilevel digital data stream identified as the signal DIGSIG. Logic 0 and logic 1 levels in the signal DIGSIG represent levels of signal VIDEO that are less than and greater than, respectively, a slicing level maintained within data slicer 310. The slicing level is generated by data slicer 310 under control of a control unit 300 via a slicer control signal SLCTRL. Control unit 300 may be a microprocessor.

Figure 1:
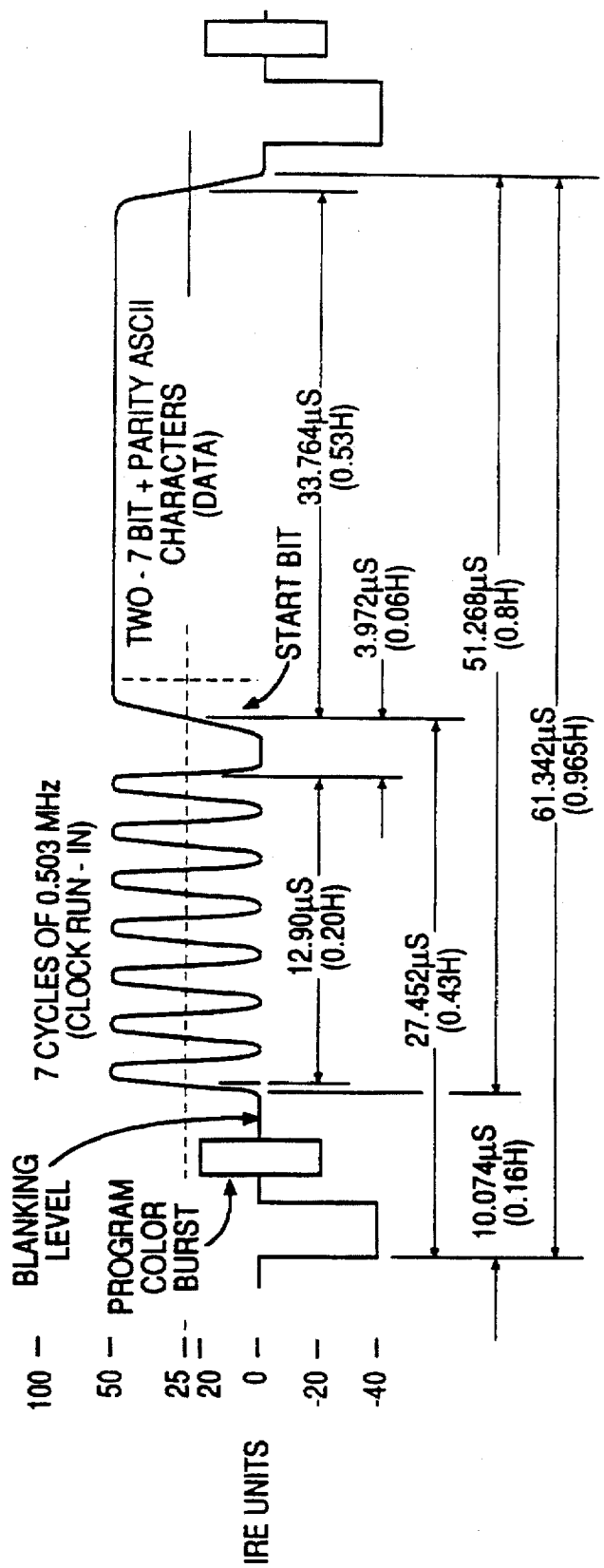
FIG. 1 is an amplitude/time waveform drawing of a standard closed caption analog signal.

As an example of the interaction between control unit 300 and data slicer 310, the control unit 300 may cause data slicer 310 to generate a preferred slicing level based on the amplitude of a run-in clock (RIC) signal that is included in the closed caption signal shown in FIG. 1. An example of a data slicer arrangement suitable for implementing data slicer 310 is described in pending U.S. patent application Ser. No. 850,481 by Rodriguez-Cavazos, et al.

The control unit 300 also monitors the signal VIDEO to determine when a line that may contain closed caption information is present in the signal VIDEO. For example, control unit 300 may include a line counter responsive to synchronization signals (e.g. horizontal and vertical sync) in the signal VIDEO that determines when line number 21 is present. When line 21 is detected, the control unit 21 activates data capture unit 350 via the signal CAPCTRL to extract character information included in line 21. Character data in line 21 occurs in the latter part of line 21 as shown in FIG. 1. Thus, data extraction is initiated by control unit 300 according to the timing shown in FIG. 1. Extracted data is communicated to control unit 300 via signal DATA.

The control unit 300 processes the extracted data to produce the signal SYSCTRL. Signal SYSCTRL may, for example, provide closed caption data in a format suitable for display to a display device. The extended data services operation may provide for a number of additional features. For example, data extracted from line 284 (even fields) may include information regarding program content or information for controlling the operation of a video cassette recorder (VCR). In the case of VCR control information, signal SYSCTRL would be coupled to appropriate control points in a VCR. The control unit 212 of the MPEG compressor 214 is programmed to recognize the decoded closed caption (or EDS) data, and to format it for inclusion in the compressed video signal headers.

Figure 4:
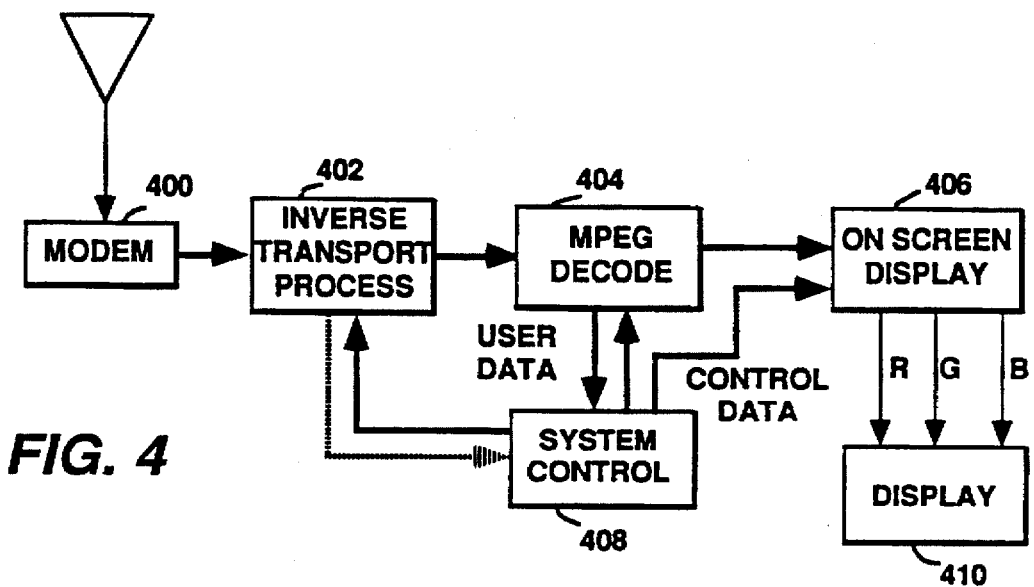
FIGS. 4 and 5 are block diagrams of alternative receiving apparatus for receiving/reproducing compressed video signal of the form transmitted by the FIG. 2 system.

FIG. 4 illustrates exemplary receiver apparatus for reproducing compressed video signal of the type generated by the FIG. 2 circuitry. In FIG. 4 transmitted compressed video signal is captured by an antenna and input to a modem 400. The modem provides baseband compressed video signal to an inverse transport processor 402. Within the inverse transport processor, transport headers are separated from compressed video payloads (MPEG formatted signal) and the transport headers are communicated to the system controller 408 to provide system synchronization with the transmitter, and to provide information regarding damaged or lost data. The compressed video signal is coupled to a decompressor such as a MPEG decoder 404. The MPEG decoder internally separates MPEG header data from compressed pixel data. The header data is utilized by the decoder to establish decompression parameters for decompressing the pixel data. The user data included in the compressed signal headers is extracted by the decoder and provided to the system controller 408. The system controller 408 assembles words of the closed caption data and provides them to a conventional on screen display device 406. Decompressed video signal is also applied to the on screen display device 406 wherein the closed caption data is superimposed on the video signal. The on screen display device 406 generates signals conditioned for application to a display element 410 for reproduction of the video images with the closed caption data superimposed thereon as text.

Figure 5:
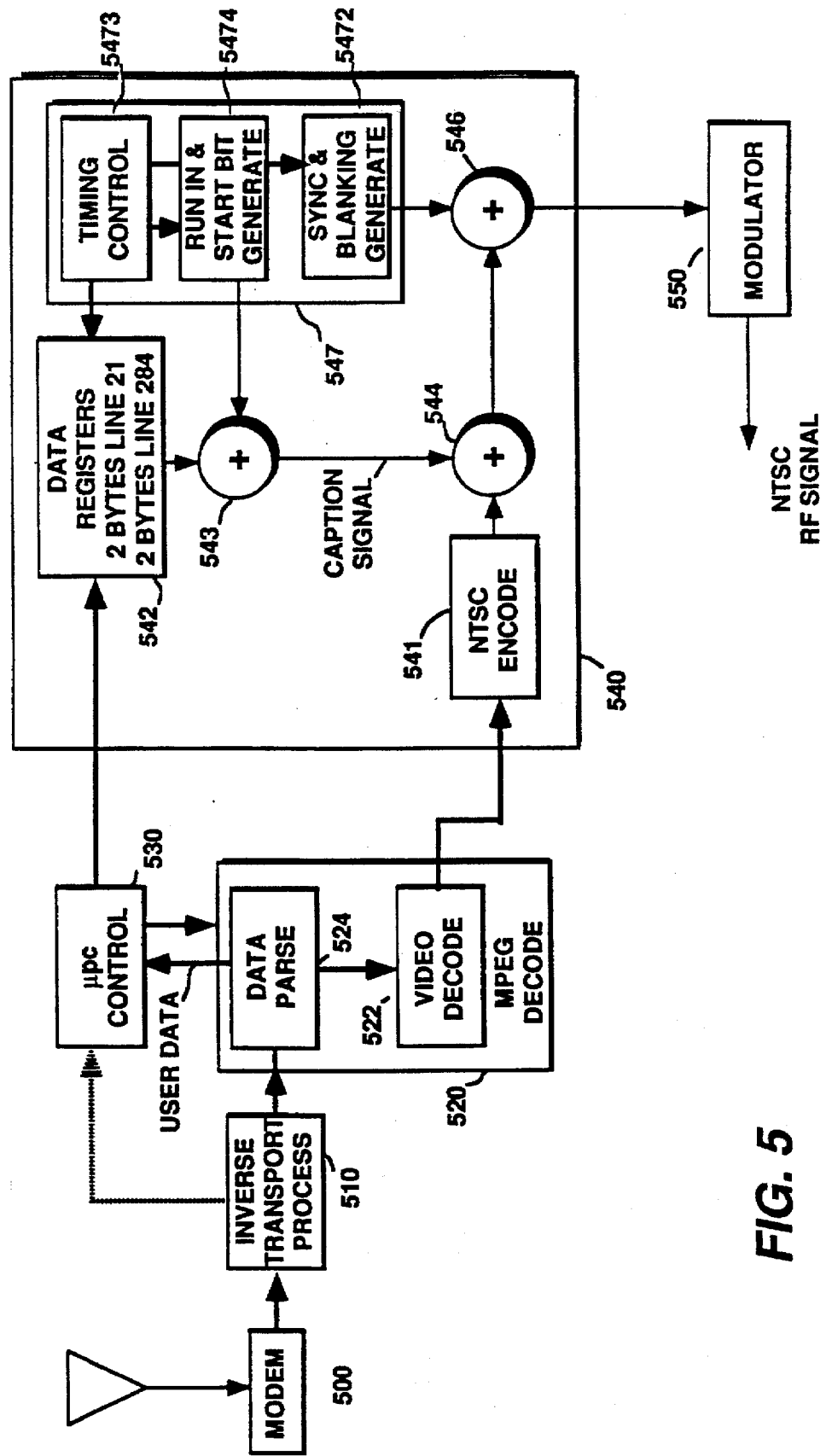

The FIG. 4 apparatus is exemplary of a television receiver designed to decode and display compressed digital video information. FIG. 5 illustrates an embodiment contemplated for use in a set top receiver which receives signal in a format different than a standard format such as NTSC, and provides signal in a standard format such as NTSC. Output signal may be provided for application to the RF input of a standard receiver, or as baseband component signals for application to an appropriate monitor.

In FIG. 5, compressed video signal of the type generated by the FIG. 2 apparatus is captured by an antenna an applied to a modem 500 which develops baseband compressed video signal. The baseband compressed video signal is applied to an inverse transport processor 510, which provides system synchronization responsive to transport header information and separates the compressed video data for application to an e.g., MPEG decoder 520. The MPEG decoder 520 includes a data parser 524 which separates header data from compressed picture data. The header data is utilized to establish appropriate decompression parameters and configure the video decoder to decompress the compressed picture data. Frames of decompressed video signal are provided to, for example, an NTSC processor 540. Within the processor 540, an NTSC encoder 541 renders decompressed frames into interlace fields. The interlace fields are coupled to an adder 544 wherein closed caption data from a further adder 543 is superimposed onto the video signal.

The original video signal may or may not have had the closed caption or EDS signal stripped therefrom prior to compression. If it was not stripped prior to compression, it is necessary therefore to insure that the closed captioned data added into the decompressed signal via adder 544 is not corrupted by remnants of decompressed closed caption data. In view of this, adder 544 may be a non-additive mixer arranged to output the closed caption signal provided by the adder 543, exclusive of the video signal provided by the encoder 541, whenever closed caption information is present.

The NTSC processor 540 also includes circuitry 5472 for generating appropriate color burst, horizontal and vertical synchronization signals. These synchronizing components are added to the video signal at the adder 546. The output of the adder 546 is baseband composite NTSC signal including FCC standard closed caption data. This signal is applied to a modulator 550 which places the baseband video signal on a RF carrier having a frequency associated with channel 3 or 4 for example.

Closed caption data transmitted as user data in MPEG picture headers is separated by the data parser 524 of the MPEG decoder 520. The closed caption data is coupled to a control unit 530 which conveys the respective closed caption data bytes, or closed caption data bytes and EDS data bytes to the NTSC processor 540. These closed caption data bytes are stored in respective registers 542. A timing control unit 5473 develops read control signals at lines 21 (and 284 if EDS is present) to read the data bytes stored in the respective registers 542 for inclusion in lines 21 (and possibly 284) of the decompressed interlaced video signal provided from the encoder 541.

A standard closed caption clock run-in signal with start bits is generated by a further element 5474. The run-in signal and the closed caption data are applied to an adder or non-additive mixer 543 wherein they are sequentially concatenated to form a signal of the form illustrated in FIG. 1 (minus burst and horizontal sync). This signal is applied to the adder 544 during line(s) 21 (284).

Alternative receiver arrangements are indicated in both FIGS. 4 and 5 by virtue of the phantom arrows drawn from the respective inverse transport processors to the respective control units. In both instances, the assumption is that the closed caption data is transmitted as part of the transport header or as auxiliary transport packets and not as part of the compressed video data. The closed caption data is separated in the transport processors and thereafter processed by the respective control units as described above.

I claim:

1. In system for digitally compressing an analog video signal which includes a closed caption-like data component, apparatus comprising:

a source (200) of said analog video signal which includes closed caption-like data;

circuitry (210) coupled to said source for separating the closed caption-like data component from said analog video signal to produce a digital data component corresponding to said closed caption-like data component;

compression apparatus (214) coupled to said source for compressing said video signal absent said closed caption-like data component, to generate a compressed digital video signal in MPEG format; and means (212) for separably combining said digital data component with said compressed digital video signal in MPEG format wherein said digital data component is included in user data fields of MPEG picture headers for transmission or storage.

2. In system for digitally compressing an analog video signal which includes a closed caption-like data component, apparatus comprising:

a source (200) of said analog video signal which includes closed caption-like data;

circuitry (210) coupled to said source for separating the closed caption-like data component from said analog video signal to produce a digital data component corresponding to said closed caption-like data component;

compression apparatus (214) coupled to said source for compressing said video signal absent said closed caption-like data component, to generate a compressed digital video signal;

a transport processor for segmenting compressed video signal into transport packet payloads of predetermined size and for forming transport headers and concatenating said payloads and transport headers to form transport packets; and means for separably combining said digital data corresponding to said closed caption-like data in transport headers.

3. In system for digitally compressing an analog video signal which includes a closed caption-like data component, apparatus comprising:

a source (200) of said analog video signal which includes closed caption-like data;

circuitry (210) coupled to said source for separating the closed caption-like data component from said analog video signal to produce a digital data component corresponding to said closed caption-like data component;

compression apparatus (214) coupled to said source for compressing said video signal absent said closed caption-like data component, to generate a compressed digital video signal;

a transport processor for segmenting compressed video signal into transport packet payloads of predetermined size and for forming transport headers and concatenating said payloads and transport headers to form transport packets, said transport processor further including means for forming auxiliary transport packets for inclusion of auxiliary data; and means to insert said digital data component in auxiliary transport packets.

4. The apparatus set forth in claim 1 further including means for replacing said closed caption-like data in said video signal provided by said source with a reference value.

5. In a system for receiving MPEG compressed video data with closed caption-like data included in MPEG Picture Header User Data, apparatus comprising:

means (524) for detecting MPEG Picture Headers in said MPEG compressed video data and extracting said closed caption-like data from user data fields therein;

means (522, 541) responsive to said MPEG compressed video data for generating a decompressed analog video signal;

a closed caption encoder, responsive to said decompressed analog video signal and extracted said closed caption-like data for generating one of a baseband and RF analog video signal with closed caption-like data therein.

6. In a system for receiving compressed video signal which has been compressed substantially according to MPEG protocol, said compressed video signal including a picture layer with picture headers and said picture headers including closed caption data, apparatus comprising:

means for providing said compressed video signal;

means for separating said closed caption data from said compressed video signal;

means responsive to said compressed video signal for generating decompressed video signal;

an on-screen display device responsive to separated closed caption data and said decompressed video signal for providing video image representative signal with closed caption text superimposed thereon.

7. In a system for receiving MPEG compressed video data with closed caption-like data included in MPEG Picture Header User Data, apparatus comprising:

means (524) for detecting MPEG Picture Headers in said MPEG compressed video data and extracting said closed caption-like data from user data fields therein;

means (522, 541) responsive to said MPEG compressed video data for generating a decompressed analog video signal;

an on-screen display device responsive to extracted said closed caption data and said decompressed video signal for providing video image representative signal with closed caption text superimposed thereon.

* * * * *